United States Patent
Chen et al.

(10) Patent No.: US 10,557,391 B1
(45) Date of Patent: Feb. 11, 2020

(54) INCINERATION SYSTEM AND PROCESS

(71) Applicant: ADVANCED COOLING TECHNOLOGIES, INC., Lancaster, PA (US)

(72) Inventors: Chien-Hua Chen, Lititz, PA (US); Bradley Richard, Lititz, PA (US); Howard Pearlman, Haddon Township, NJ (US); Joel Crawmer, Lancaster, PA (US)

(73) Assignee: ADVANCED COOLING TECHNOLOGIES, INC., Lancaster, PA (US)

( * ) Notice: Subject to any disclaimer, the term of this patent is extended or adjusted under 35 U.S.C. 154(b) by 271 days.

(21) Appl. No.: 15/598,512

(22) Filed: May 18, 2017

(51) Int. Cl.
*F01N 3/20* (2006.01)

(52) U.S. Cl.
CPC ......... *F01N 3/2013* (2013.01); *F01N 3/2033* (2013.01); *F01N 2270/04* (2013.01); *F01N 2330/32* (2013.01); *F01N 2560/02* (2013.01); *F01N 2900/0416* (2013.01)

(58) Field of Classification Search
CPC .. F01N 3/2013; F01N 3/2033; F01N 2270/04; F01N 2560/02; F01N 2900/0416
See application file for complete search history.

(56) References Cited

U.S. PATENT DOCUMENTS

| | | | |
|---|---|---|---|
| 1,799,039 A * | 3/1931 | Conejos | F28D 21/0008 126/104 A |
| 2,768,508 A * | 10/1956 | Guyton | F25B 39/04 165/110 |
| 3,302,683 A * | 2/1967 | Kemp | C21B 9/10 165/909 |
| 3,351,563 A | 11/1967 | Negra et al. | |
| 3,397,028 A | 8/1968 | Brauer | |
| 3,854,530 A * | 12/1974 | Jouet | B21D 53/027 165/110 |

(Continued)

FOREIGN PATENT DOCUMENTS

| | | |
|---|---|---|
| CA | 2436997 C | 7/2010 |
| CN | 101589275 A | 11/2009 |

(Continued)

*Primary Examiner* — Avinash A Savani
*Assistant Examiner* — Martha M Becton
(74) *Attorney, Agent, or Firm* — McNees Wallace & Nurick LLC

(57) ABSTRACT

An incineration system includes an inlet channel supplying an inlet stream comprising a waste gas containing at least one volatile organic compound, a waste gas sensor measuring at least one property of the waste gas, an oxidizing gas supply controllably providing oxidizing gas to the inlet channel, an incinerator receiving the inlet stream from the inlet channel, an ignitor initiating combustion of the inlet stream in the reaction zone of the incinerator, and a controller receiving data from the waste gas sensor and controlling flow of oxidizing gas from the oxidizing gas supply into the inlet channel. The spiral heat exchanger defines a reaction zone, an incoming path from the inlet channels to the reaction zone, and an outgoing path from the reaction zone to an exhaust channel. The incoming path and the outgoing path extend in alternating concentric spirals with the incoming path being countercurrent to the outgoing path.

18 Claims, 5 Drawing Sheets

(56) References Cited

U.S. PATENT DOCUMENTS

| | | | | |
|---|---|---|---|---|
| 3,898,040 | A * | 8/1975 | Tabak | B01J 8/02 422/171 |
| 3,909,299 | A * | 9/1975 | Corrigan | B01J 8/062 422/198 |
| 4,227,021 | A | 10/1980 | Grosskinsky et al. | |
| 4,369,029 | A | 1/1983 | Forster et al. | |
| 4,577,683 | A * | 3/1986 | Kelch | F28D 9/04 165/164 |
| 4,876,409 | A * | 10/1989 | Leyshon | B01J 8/02 585/500 |
| 4,911,894 | A * | 3/1990 | Retallick | B01D 53/86 422/174 |
| 5,188,740 | A | 2/1993 | Khan | |
| 5,220,955 | A * | 6/1993 | Stokes | F04D 29/5826 165/122 |
| 5,252,299 | A * | 10/1993 | Retallick | A62B 11/00 422/174 |
| 5,326,537 | A * | 7/1994 | Cleary | B01J 12/007 422/173 |
| 5,520,864 | A | 5/1996 | Frei | |
| 5,529,484 | A | 6/1996 | Moard et al. | |
| 5,567,390 | A * | 10/1996 | Cleary | B01J 12/007 422/111 |
| 5,601,790 | A | 2/1997 | Stilger et al. | |
| 5,618,322 | A * | 4/1997 | Mizuno | B01J 8/0207 48/127.7 |
| 5,637,283 | A | 6/1997 | Stilger et al. | |
| 5,651,800 | A * | 7/1997 | Mizuno | B01J 8/0207 48/197 R |
| 5,916,531 | A * | 6/1999 | Pan | B01D 53/0446 210/304 |
| 5,922,178 | A * | 7/1999 | Isenberg | B01D 53/00 204/241 |
| 6,083,425 | A * | 7/2000 | Clawson | B01J 8/0278 252/372 |
| 6,123,913 | A * | 9/2000 | Clawson | B01J 8/0278 252/373 |
| 6,126,908 | A * | 10/2000 | Clawson | B01J 8/0278 422/198 |
| 6,169,962 | B1 * | 1/2001 | Brookshire | B09B 1/00 702/47 |
| 6,207,122 | B1 * | 3/2001 | Clawson | B01J 8/0278 423/418.2 |
| 6,254,839 | B1 * | 7/2001 | Clawson | B01J 8/0278 422/198 |
| 6,282,371 | B1 * | 8/2001 | Martin | F01N 3/2013 165/164 |
| 6,468,480 | B1 * | 10/2002 | Clawson | B01J 8/0278 422/198 |
| 6,532,339 | B1 * | 3/2003 | Edgar | F24H 1/0045 392/465 |
| 6,613,972 | B2 | 9/2003 | Cohen et al. | |
| 6,616,188 | B1 | 9/2003 | Jefferies et al. | |
| 6,814,132 | B1 * | 11/2004 | Ike | F28D 9/04 165/10 |
| 6,840,762 | B2 * | 1/2005 | Maruta | F23D 14/125 431/170 |
| 6,935,105 | B1 * | 8/2005 | Page | B01D 53/944 60/298 |
| 6,936,238 | B2 | 8/2005 | Sennoun et al. | |
| 6,951,456 | B2 | 10/2005 | Cohen et al. | |
| 7,025,119 | B2 * | 4/2006 | Ike | F28D 9/04 165/10 |
| 7,135,154 | B2 * | 11/2006 | Deshpande | C01B 3/16 422/173 |
| 7,247,402 | B2 * | 7/2007 | Haile | H01M 8/04007 429/440 |
| 7,316,563 | B2 | 1/2008 | Marshall | |
| 7,625,414 | B2 * | 12/2009 | Nougier | B01J 8/0221 422/198 |
| 3,038,957 | A1 | 10/2011 | Cleary | |
| 8,038,957 | B1 * | 10/2011 | Cleary | B01J 8/0257 422/110 |
| 8,323,363 | B2 | 12/2012 | Bingue et al. | |
| 8,635,865 | B2 * | 1/2014 | Lattin | F01N 3/0253 60/274 |
| 8,721,981 | B2 * | 5/2014 | Freund | F28D 9/04 165/164 |
| 9,328,916 | B2 * | 5/2016 | Lampe | F23N 1/022 |
| 9,381,484 | B2 * | 7/2016 | Armstrong | B01J 8/062 |
| 9,595,726 | B2 | 3/2017 | Chen et al. | |
| 2002/0020113 | A1 | 2/2002 | Kennedy et al. | |
| 2004/0123523 | A1 | 7/2004 | Rong et al. | |
| 2005/0074712 | A1 * | 4/2005 | Brookshire | F23G 5/34 431/202 |
| 2005/0084812 | A1 | 4/2005 | Rakhmailov et al. | |
| 2007/0131909 | A1 | 6/2007 | Rojey et al. | |
| 2008/0141951 | A1 | 6/2008 | Liu | |
| 2008/0249196 | A1 | 10/2008 | Wentink | |
| 2009/0087801 | A1 | 4/2009 | Schoegl et al. | |
| 2009/0119991 | A1 | 5/2009 | Johnson et al. | |
| 2010/0175639 | A1 | 7/2010 | Al-Dawood et al. | |
| 2010/0292524 | A1 * | 11/2010 | Turner | C10L 3/08 585/802 |
| 2011/0120012 | A1 | 5/2011 | Balmas et al. | |
| 2011/0168360 | A1 * | 7/2011 | Chang | F28F 3/048 165/104.31 |
| 2012/0095118 | A1 | 4/2012 | Bracht et al. | |
| 2013/0015405 | A1 | 1/2013 | Quintero et al. | |
| 2013/0105739 | A1 | 5/2013 | Bingue et al. | |
| 2015/0191352 | A1 * | 7/2015 | Chen | H01M 8/0618 429/425 |
| 2016/0245509 | A1 * | 8/2016 | Karkow | F23D 14/48 |

FOREIGN PATENT DOCUMENTS

| | | |
|---|---|---|
| DE | 19903168 A1 | 8/2000 |
| DE | 10345902 B4 | 5/2005 |
| DE | 102007025785 B4 | 2/2009 |
| EP | 1345679 B1 | 3/2013 |
| JP | 2007507686 A | 11/2007 |
| JP | 2010513834 A | 4/2010 |
| WO | 0247186 A2 | 6/2002 |
| WO | 2007121004 A2 | 10/2007 |
| WO | 2013008020 A1 | 1/2013 |

* cited by examiner

INCINERATION SYSTEM AND PROCESS

STATEMENT REGARDING FEDERALLY SPONSORED RESEARCH

This invention was made with Government support under contract number DE-SC0011884 awarded by the Department of Energy. The Government has certain rights in the invention.

FIELD OF THE INVENTION

The present invention is directed to incineration processes and systems. More particularly, the present invention is directed to processes and systems including an incinerator with a spiral heat exchanger for incinerating volatile organic compounds (VOCs).

BACKGROUND OF THE INVENTION

Starting in 2009, the United States has been the largest natural gas producing country in the world as a result of advanced drilling technologies enabling economical access to the gas from shale deposits. The increased collection of natural gas from shale deposits offers several benefits including economic growth and improved energy independence. However, the collection also creates potential environmental issues, one of which is emissions of volatile organic compounds (VOCs) from the natural gas condensate tanks. Also, VOCs may react with $NO_x$ in the presence of sunlight to form smog, which may cause serious human health issues and affect visibility. To address the potential environmental impact, the Environmental Protection Agency (EPA) has issued regulations that require the oil and gas storage and condensate tanks to reduce the VOC emissions by 95% if the VOCs emissions are greater than 6 tons/yr.

In addition to the VOCs released from oil and gas storage and condensate tanks, other waste VOCs, such as, for example, biogas from landfills or waste gas from chemical plants, need to be addressed, and the exhaust after combustion must satisfy current environmental regulations. Landfill waste generates gas consisting of about 40% to about 60% methane, with the rest of the gas primarily being carbon dioxide. Conventionally, the gas is collected and sent to a flare or oxidizer to prevent the release of methane into the atmosphere. These waste gas streams may not have sufficient heating value to sustain the combustion, and a significant amount of supplemental fuel may be needed to achieve a clean incineration process. The need for supplemental fuel not only increases the operational cost to reduce methane emissions but also results in increased greenhouse emissions.

A 95% reduction in VOC emissions is conventionally typically achieved by use of a vapor recovery unit (VRU) or by use of a combustion control device in a method known as flaring.

A VRU is able to recover the waste VOCs and transport them in a pipeline for sale or for use on-site, but the capital and operational costs are high.

In cases where VOC recovery is difficult or not economically feasible, combustion control devices are the most common solution. An open flare is the most economical and common thermal oxidation system used in the field. However, since the new EPA regulations require stricter emission standards and no visible emissions for the storage or condensate tank combustion device, an enclosed flaring system is considered to be a more feasible option to meet the new stringent requirements. In addition, the new regulations require a flame to be present at all times. Supplemental fuel is therefore needed for incinerating low heating value VOCs and for sustaining the pilot flame, which increases the operational cost. To reduce this fuel consumption and therefore the cost, heat recovery may be considered. In one type of conventional VOC incinerator, called a regenerative thermal oxidizer (RTO), two ceramic beds alternately recover heat and preheat the incoming flow. A 95% heat recovery can be achieved and a destruction efficiency greater than 98% has been reported. While the high heat recovery of RTOs provides significant energy benefits, a drawback is the need to constantly switch the flow direction between the two ceramic beds with valves. These moving parts typically increase maintenance costs. In addition, RTOs have a high capital cost to manufacture, making them not very cost effective for condensate tank emission control applications that have relatively low vent flow rates.

The biogas generated by landfill waste is conventionally incinerated in an enclosed flare. While this method successfully prevents the release of methane, there are two major challenges associated with enclosed flares. First, the waste gas and air are non-premixed. This results in hot reaction spots during combustion that increases the exhaust concentration of $NO_x$, which must be maintained less than 0.06 lb/MMBTU. Second, when the methane makes up less than 40% of the waste gas, the reaction instability may cause incomplete destruction, in which case supplemental fuel is needed for complete destruction.

BRIEF DESCRIPTION OF THE INVENTION

In an exemplary embodiment, an incineration system includes an inlet channel supplying an inlet stream comprising a waste gas containing at least one volatile organic compound, a waste gas sensor measuring at least one property of the waste gas, an oxidizing gas supply controllably providing oxidizing gas to the inlet channel, an incinerator receiving the inlet stream from the inlet channel, an ignitor initiating combustion of the inlet stream in the reaction zone of the incinerator, and a controller receiving data from the waste gas sensor and controlling flow of oxidizing gas from the oxidizing gas supply into the inlet channel. The spiral heat exchanger defines a reaction zone, an incoming path from the inlet channels to the reaction zone, and an outgoing path from the reaction zone to an exhaust channel. The incoming path and the outgoing path extend in alternating concentric spirals with the incoming path being countercurrent to the outgoing path.

In another exemplary embodiment, a combustion device includes a spiral heat exchanger and a reaction zone. The spiral heat exchanger defines an incoming path and an outgoing path. The incoming path and the outgoing path extend in alternating concentric spirals with the incoming path being countercurrent to the outgoing path. The reaction zone fluidly connects to the incoming path at a first end of the reaction zone and to the outgoing path at a second end of the reaction zone such that fluid flows through the reaction zone in a substantially axial direction with respect to the alternating concentric spirals.

In another exemplary embodiment, an incineration process includes directing an inlet stream comprising a waste gas comprising at least one volatile organic compound into an incoming path of an incinerator, heating the inlet stream along the incoming path while cooling an outlet stream in the outgoing path by heat exchange with the outlet stream, and incinerating the volatile organic compound of the inlet stream in the reaction zone to form the outlet stream. The spiral heat exchanger defines the incoming path and the outgoing path. The incoming path and the outgoing path extend in alternating concentric spirals with the incoming path being countercurrent to the outgoing path.

Other features and advantages of the present invention will be apparent from the following more detailed description, taken in conjunction with the accompanying drawings, which illustrate, by way of example, the principles of the invention.

BRIEF DESCRIPTION OF THE DRAWINGS

Wherever possible, the same reference numbers will be used throughout the drawings to represent the same parts.

DETAILED DESCRIPTION OF THE INVENTION

Provided are volatile organic compound (VOC) incineration processes and systems. Embodiments of the present disclosure, for example, in comparison to similar processes and systems that do not include one or more of the features disclosed herein, require less fuel consumption for a sustained-flame reaction zone, produce no detectable emissions, have a wider working range, operate with fuel-lean mixtures at up to ten times lower than a conventional flammability limit, incinerate without a catalyst, significantly reduce or eliminate the need for a supplemental fuel, achieve premixed combustion, produce minimum $NO_x$ emissions, produce lower $NO_x$ emissions, produce $NO_x$-free emissions, produce soot-free emissions, include no moving parts in the incinerator, reduce the thermal radiation level of the exhaust, reduce the noise level produced by the exhaust, reduce greenhouse gas emissions, achieve higher thermal efficiency, or a combination thereof.

A non-catalytic, low-$NO_x$ fuel-efficient incinerator system includes a combustion chamber surrounded by a spiral heat exchanger to recover heat from the product. Unlike regenerative thermal oxidizers (RTOs), the incinerator system is a single once-through system with no moving parts, and there is no need to periodically change the flow direction. With the excess thermal enthalpy in the incoming reactant stream including at least one VOC, the flammability limit for the reactants is significantly extended. Since the combustion is sustainable with much less chemical enthalpy in the reactant stream, the need for supplemental fuel for low heating value waste gas stream incineration is reduced or eliminated.

In addition, the highly preheated reactants enable the VOC combustion to be sustained at temperatures in the range of about 1000° C. to about 1200° C. (about 1830° F. to about 2190° F.), which significantly reduces the formation of $NO_x$. A significant amount of the heat from the outlet stream is recovered by the inlet stream.

Figure 1:
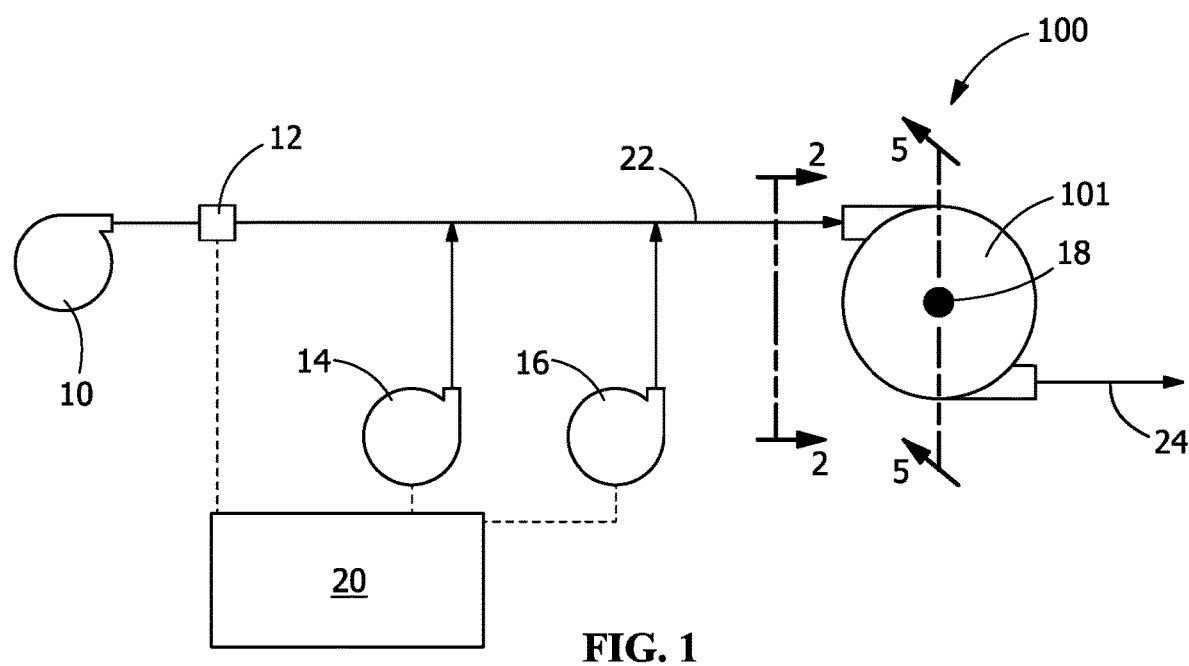
FIG. 1 is a schematic view of an incineration system, according to an embodiment of the present disclosure.

Referring to FIG. 1, the incineration system 100 includes a waste gas sensor 12, an oxidizing gas supply 14, an optional supplemental fuel supply 16, an incinerator 101, an ignitor 18, and a controller 20. A waste gas supply 10 provides a waste gas containing at least one VOC to the incineration system 100. In some embodiments, the waste gas is vented gas from a natural gas condensate tank, a landfill, a chemical plant, or another source. The properties of the incoming waste gas are monitored by the waste gas sensor 12. The monitored properties may include, but are not limited to, the chemical composition of the incoming waste gas, the flow rate of the incoming waste gas, the temperature of the waste gas, and any other parameters that may affect the combustion of the waste gas VOCs in the incinerator. The collected data is sent to the controller 20, which adjusts the flow of oxidizing gas from the oxidizing gas supply 14 and supplemental fuel from the supplemental fuel supply 16 accordingly to maintain complete or near-complete combustion. The supplemental fuel is only supplied as needed and may not be needed at some or all times during operation of the incineration system 100, depending on the composition of the waste gas. The waste gas, oxidizing gas, and supplemental fuel, as needed, are premixed and enter into the incinerator 101 as a fuel-lean inlet stream by way of an inlet channel 22. The oxidizing gas may be any oxidizing gaseous composition including at least one oxidizer that contributes to the formation of a desired fuel-lean inlet stream for incineration, including, but not limited to, air, oxygen, or a combination thereof.

During startup, the ignitor 18 provides the energy required to begin the oxidation of the VOC and any supplemental fuel in the fuel-lean inlet stream. The ignitor 18 may be any device capable of safely initiating combustion, including, but not limited to, a glow plug, a spark plug, a resistance wire, or a pilot flame. Once the reaction is started and the incinerator 101 reaches operating temperatures, the reaction becomes self-sustaining and the ignitor 18 may be turned off. The controller 20 adjusts the concentrations of oxidizing gas and supplemental fuel to maintain a reaction in the reaction zone of the incinerator 101 based on the flow rate and heating value of the incoming waste gas stream, as measured by the waste gas sensor 12. In some embodiments, the controller 20 also receives temperature data from a reaction zone sensor (not shown) for the reaction zone and/or temperature data and/or composition data from an exhaust sensor (not shown) for the exhaust stream exiting the incinerator 101 by way of an exhaust channel 24 and adjusts the concentrations of oxidizing gas and supplemental fuel based on that information as well as on the data from the waste gas sensor 12.

Figure 2:
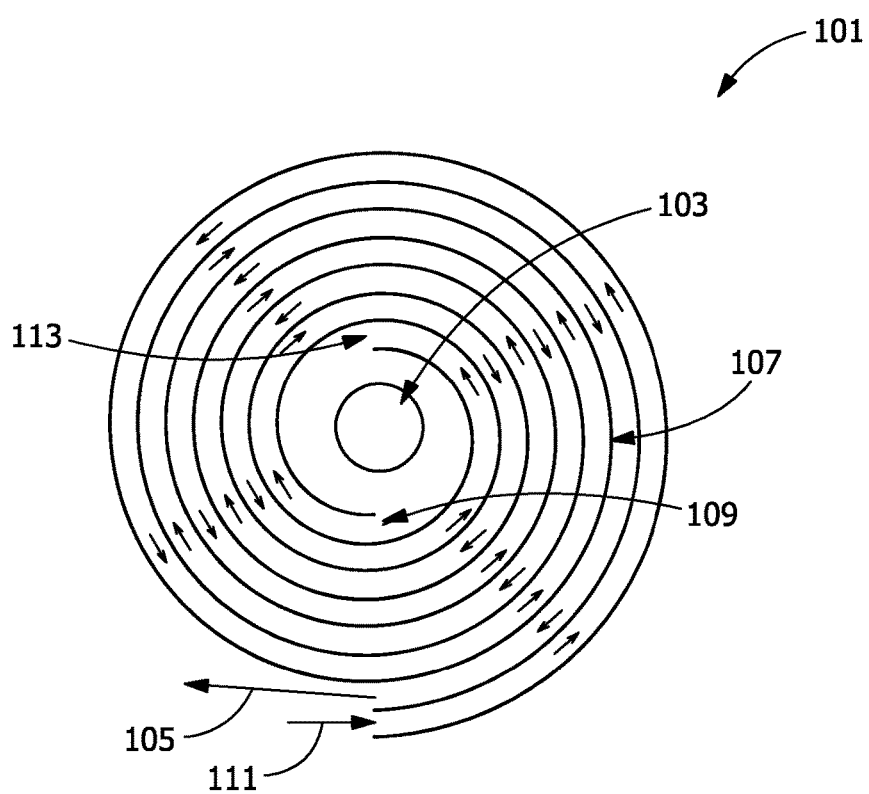
FIG. 2 is a schematic cross sectional view of the incinerator of the incineration system of FIG. 1 along line 2-2 of FIG. 1.

Referring to FIG. 2, a cross sectional view of an incinerator 101 schematically shows the incoming path 113 for the fuel-lean inlet stream 111, the outgoing path 109 for the exhaust stream 105, and the reaction zone 103. A spiral heat exchanger 107 includes a double spiral, one of which defines the incoming path 113 and the other an outgoing path 109. A reaction zone 103 in the center of the double spiral fluidly connects the incoming path 113 to the outgoing path 109. The reaction zone 103 is configured for exothermic complete or near-complete combustion of the fuel reactants in the fuel-lean inlet stream 111. The reaction zone 103 is arranged and disposed within the incinerator 101, for example, in the middle or substantially in the middle of the incinerator 101. The reaction zone 103 is defined by internal structures (not shown) and/or elements of one or more features described hereinafter. The reaction zone 103 includes any suitable features permitting operation at high temperatures and/or complete or near-complete combustion conditions. In some embodiments, an incineration process using the incinerator 101 operates energetically self-sustained and without a catalyst by generating an exhaust stream 105 by the exothermic complete or near-complete combustion process, while heating the fuel-lean inlet stream 111 upstream of the reaction zone 103, for example, with the spiral heat exchanger 107, that efficiently transfers heat from the exhaust stream 105 in the outgoing path 109 to the fuel-lean inlet stream 111 flowing in adjacent spiral windings.

In some embodiments, the reaction occurring in the reaction zone 103 at the center of the incinerator 101 is self-sustained at a temperature of about 1000° C. to about 1200° C. (about 1830° F. to about 2190° F.), which is sufficient to oxidize VOCs or methane while significantly reducing $NO_x$ formation even under excess oxygen conditions. Conventional combustion control devices, including RTOs and enclosed flares, are non-premixed diffusion flame systems which often have local hot and cold spots. The long spiral inlet channel of the incinerator 101 of the present disclosure provides a high degree of mixing of the fuel-lean inlet stream 111, resulting in the elimination of local hot and cold spots in the reaction zone 103. This provides several advantages for incineration, such as reducing or eliminating soot and $NO_x$ formation, as well as increasing combustion efficiency. In addition, the exhaust stream 105 is cooled down before being vented to the environment, which reduces the thermal radiation and exhaust flow rate (due to less thermal expansion), and therefore the noise level.

The incinerator 101 and/or one or more components within the incinerator 101 are fabricated from any material capable of handling the operational conditions. Such materials may include, but are not limited to, stainless steel and nickel-based superalloys.

The incoming path 113 and the outgoing path 109 extend from the reaction zone 103, for example, in a spiraling countercurrent arrangement. In some embodiments, the merger of the incoming path 113 and the outgoing path 109 define the reaction zone 103. In some embodiments, one or both of the incoming path 113 and the outgoing path 109 spiral from the reaction zone 103, for example, along the spiral heat exchanger 107. The spiral nature of the spiral heat exchanger 107 includes any suitable arrangement with complete or partial overlapping of the incoming path 113 and the outgoing path 109 that permits separate fluid transport. Suitable arrangements include, but are not limited to, an arrangement of two or more plates coiled to form a spiral as is shown in FIG. 2, a cuboid arrangement of one or more plates forming a square spiral, a three-dimensional toroidal arrangement, or a combination thereof. In some embodiments, the spiral heat exchanger 107 includes one or more heat transfer enhancements, for example, as occur naturally (Dean vortices) and/or through including additional inserts or other heat transfer enhancements to generate turbulence or otherwise increase heat transfer and/or enable the outgoing path 109 and/or the incoming path 113 to maintain a desired heat transfer rate.

In general, the spiral arrangement includes any suitable dimensions and/or configuration. The spiral arrangement includes any suitable number of turns, which are substantially extensions around the reaction zone 103. Suitable numbers of turns include, but are not limited to, about 3 turns (about 1080°) or more, about 6 turns (about 2160°) or more, about 10 turns (about 3600°) or more, about 12 turns (about 4320°) or more, about 16 turns (about 5760°) or more, in the range of about 3 turns to about 10 turns (about 1080° to about 3600°), in the range of about 3 turns to about 12 turns (about 1080° to about 4320°), in the range of about 6 turns to about 12 turns (about 2160° to about 4320°), in the range of about 10 turns to about 12 turns (about 3600° to about 4320°), in the range of about 3 turns to about 16 turns (about 1080° to about 5760°), in the range of about 6 turns to about 16 turns (about 2160° to about 5760°), in the range of about 10 turns to about 16 turns (about 3600° to about 5760°), or any suitable value, range, or sub-range therein.

The spiral arrangement includes any suitable separation for the incoming path 113 and/or the outgoing path 109. Suitable thicknesses of the incoming path 113 and/or the outgoing path 109 within one or more of the turns include, but are not limited to, in the range of about 2 mm to about 3 mm, in the range of about 1 mm to about 5 mm, in the range of about 1 mm to about 4 mm, in the range of about 2 mm to about 5 mm, about 2 mm, about 2.5 mm, about 3 mm, or any suitable combination, sub-combination, range, or sub-range therein. In some embodiments, the incoming path 113 and/or the outgoing path 109 increase in width consistent with increased pressure regions.

The spiral arrangement also includes any suitable dimensions for the axial length of the incoming path 113 and/or the outgoing path 109. Suitable dimensions include, but are not limited to, in the range of about 10 mm to about 100 mm, in the range of about 20 mm to about 80 mm, in the range of about 30 mm to about 70 mm, in the range of about 40 mm to about 60 mm, in the range of about 45 mm to about 55 mm, about 45 mm, about 50 mm, about 55 mm, or any suitable combination, sub-combination, range, or sub-range therein. In some embodiments, the reaction zone 103 extends axially along the region between the incoming path 113 and the outgoing path 109, which provides greater heat release to loss (through end plates) ratio, and therefore, more of a heat recirculation effect.

The spiral arrangement produces multiple heat transfer benefits. In some embodiments, the spiral arrangement increases a heat transfer effect, for example, through centrifugal instability that occurs within the spiral channel. Additionally or alternatively, in some embodiments, the spiral arrangement provides a larger ratio of heat exchange area to heat loss area, thereby increasing exchanger efficiency for a defined volume, in comparison to non-spiraling arrangements. In some embodiments, the configuration of the arrangement and/or the number of the turns is selected to correspond to such properties.

The reaction zone 103 generates the exhaust stream 105 from the exothermic complete or near-complete oxidation of the VOCs and supplemental fuel in the fuel-lean inlet stream 111 provided via the incoming path 113. The fuel-lean inlet stream 111 may have any suitable composition capable of producing exothermic complete or near-complete combustion of the VOCs and any supplemental fuel in the fuel-lean inlet stream 111. Suitable compositions of the supplemental fuel may include, but are not limited to, methane, propane, vaporized liquid fuel (for example, n-heptane, kerosene-based fuel, and/or Jet Propellant 8 jet fuel defined by Military Specification ML-DTL-83133), pulverized solid fuel (for example, coal-oxidizing gas, and/or biomass-oxidizing gas mixtures), or a combination thereof.

Heat generated from the exothermic complete or near-complete oxidation is transferred from the exhaust stream 105 to the fuel-lean inlet stream 111, the incoming path 113, and/or the spiral heat exchanger 107. In some embodiments, the heat is transferred by the outgoing path 109 being in heat exchanging contact with the incoming path 113 and/or the spiral heat exchanger 107. In some embodiments, the transfer of the heat permits a high reaction temperature, resulting in a fast reaction rate and the incineration process being energetically self-sustained and/or operating without a catalyst.

According to some embodiments of the process, the fuel-lean inlet stream 111 and/or the incoming path 113 are at a lowest temperature (for example, ambient temperature) upon entry to the incinerator 101. The temperature of the fuel-lean inlet stream 111 and/or the incoming path 113 increases via heat recirculation along the direction of flow until reaching the reaction zone 103 and then the exothermic oxidation further increases the temperature to the highest temperature, for example, between about 1000° C. and about 1200° C. (about 1830° F. and about 2190° F.), at or near the reaction zone 103. The exhaust stream 105 travels from the reaction zone 103 through the outgoing path 109. The outgoing path 109 and the exhaust stream 105 are at a highest temperature, for example, between about 1000° C. and about 1200° C. (about 1830° F. and about 2190° F.), at the reaction zone 103 and decrease in temperature while flowing along the direction of flow until reaching a lower exit temperature upon exiting the incinerator 101.

Figure 3:
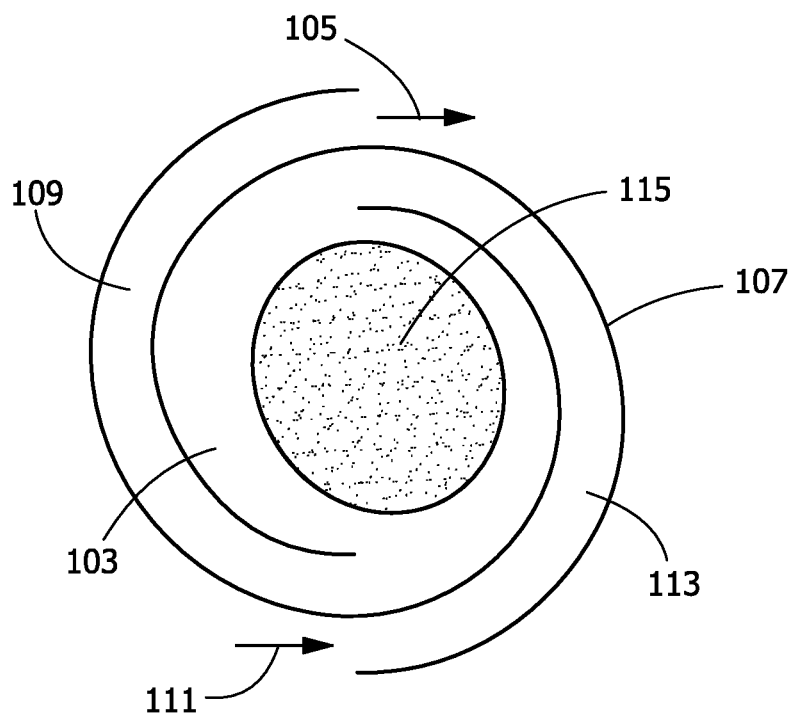
FIG. 3 is a schematic view of a recirculation zone in the reaction zone of the incinerator of FIG. 2.

Referring to the embodiment of FIG. 3, the design of the spiral heat exchanger 107 to define the incoming path 113, the reaction zone 103, and the outgoing path 109 causes the formation of a flow recirculation zone 115 within the reaction zone 103, thereby significantly reducing the effective volume in which combustion takes place within the reaction zone 103. This results in a fast flow speed in the flow recirculation zone 115, a reduction of the effective volume of the reaction zone 103, and a reduction of the residence time for chemical reaction. To accommodate a large flow rate, however, it is important to reduce the flow speed in the reaction zone 103 to achieve sufficient incineration in many incineration applications.

Figure 4:
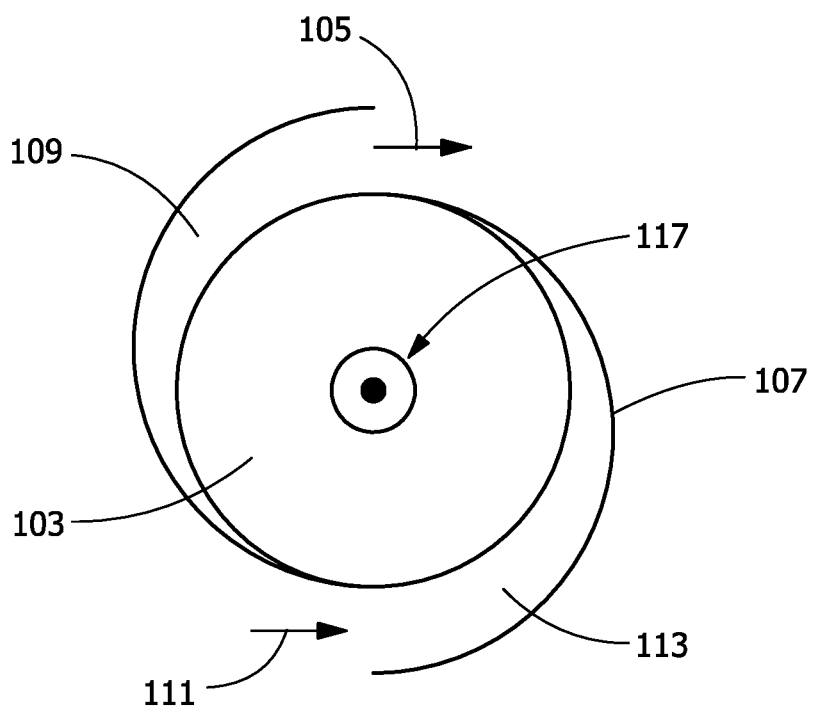
FIG. 4 is a schematic view of a reaction zone of the incinerator of FIG. 2 without a recirculation zone.

Referring to FIG. 4, a flow recirculation zone in the reaction zone 103 is reduced or eliminated by requiring out-of-plane axial flow 117 instead of the substantially only in-plane flow in the design of FIG. 3.

Figure 5:
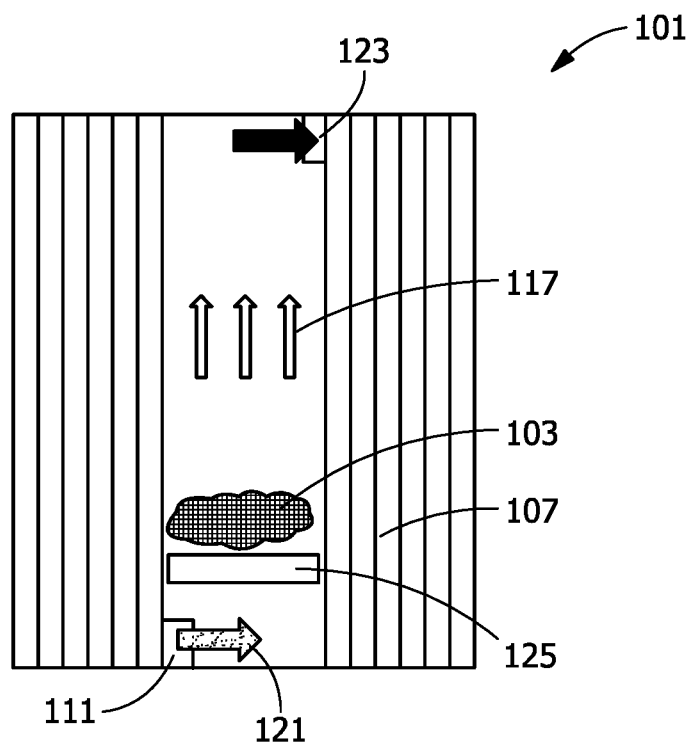
FIG. 5 is a schematic cross sectional view of the incinerator of FIG. 2 along line 5-5 of FIG. 1.
Figure 6:
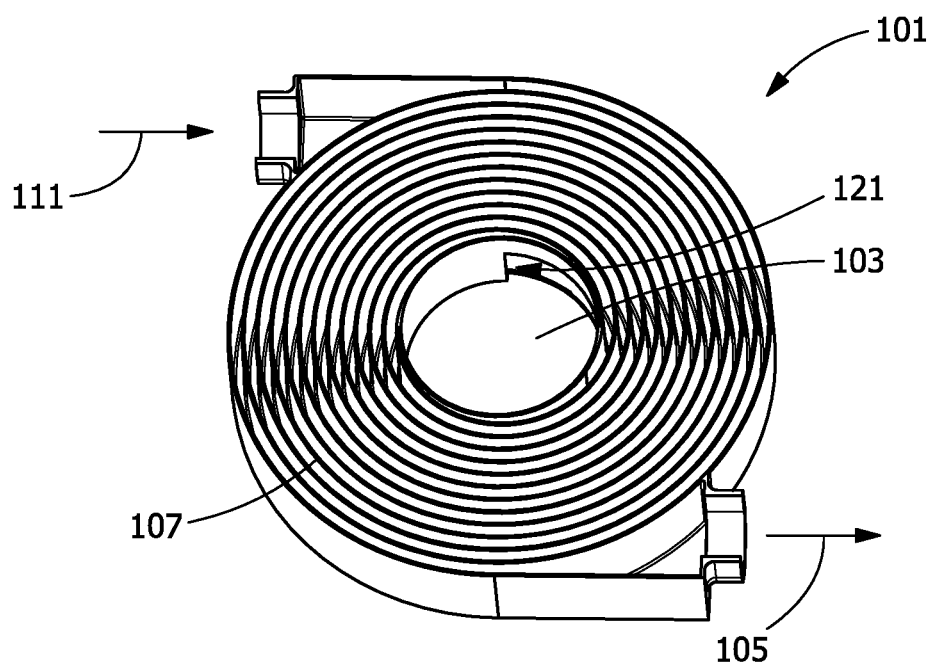
FIG. 6 is another schematic cross sectional view of the incinerator of FIG. 2 along line 2-2 of FIG. 1.

FIG. 5 and FIG. 6 show two different cross sections of an incinerator 101 having an axial flow 117 in the reaction zone 103, as shown in FIG. 4. The reaction zone 103 is basically a substantially cylindrical tube with the fuel-lean inlet stream 111 entering through a reaction zone inlet 121 at a first end of the cylinder followed by combustion during axial flow 117 through the reaction zone 103 and leaving the reaction zone 103 through a reaction zone outlet 123 at a second end of the cylinder opposite the first end. The axial flow 117 provides an increased effective volume of the reaction zone 103 as compared to the design of FIG. 3. A flow straightener 125 may be placed in the flow path after the reaction zone inlet 121 of the reaction zone 103 to reduce or eliminate a radial or swirling component in the flow of the fuel-lean inlet stream 111. The flow straightener 125 may have any structure that permits passage of the fuel-lean inlet stream 111 while reducing the radial component of the flow of the fuel-lean inlet stream 111. In some embodiments, the flow straightener 125 functions as a flame holder to provide a more stable combustion zone. The flow straightener 125 may have any composition that is compatible with the operating conditions, including, but not limited to, the operating temperature of the reaction zone 103. In some embodiments, the flow straightener 125 is made of a ceramic, such as, for example, alumina, or a metal, such as, for example, an austenitic nickel-chromium-based superalloy.

EXAMPLES

Figure 7:
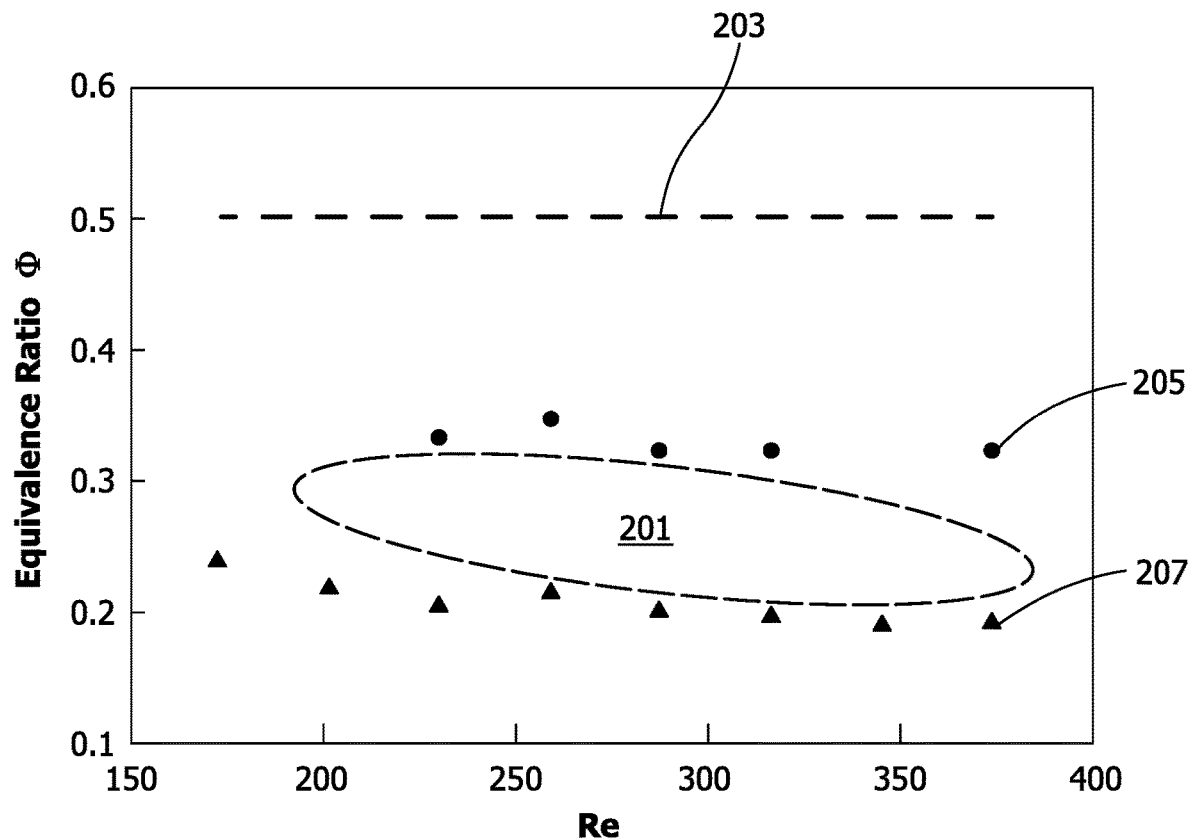
FIG. 7 is a graph of an operational range of an incinerator in an incinerator system, according to an embodiment of the present disclosure.

Referring to FIG. 7, an incinerator 101 was tested to determine the approximate operating range 201 for self-sustained combustion in the reaction zone 103 of the incinerator 101 as a function of the Reynolds number ($Re_D$) of the axial flow 117 through the reaction zone 103 and of the equivalence ratio ($\Phi$) of the fuel-lean inlet stream 111. As shown by FIG. 7, the incinerator 101 operates at an equivalence ratio well below the conventional lean limit 203 of 0.5. An upper limit to the operating range in equivalence ratio was determined by increasing the relative fuel content until an out-of-center limit 205 was reached. A lower limit to the operating range in equivalence ratio was determined by decreasing the relative fuel content until an extinction limit 207 was reached.

The incinerator 101 may operate with an equivalence ratio in the range of about 0.2 to about 0.3, alternatively in the range of about 0.22 to about 0.28, alternatively in the range of about 0.24 to about 0.26, alternatively about 0.25, alternatively less than about 0.35, or any value, range, or sub-range therebetween. The incinerator 101 may operate with a Reynolds number in the range of about 200 to about 380, alternatively in the range of about 230 to about 350, alternatively in the range of about 250 to about 330, alternatively in the range of about 280 to about 300, alternatively in the range of about 200 to about 1000, alternatively in the range of about 300 to about 1000, alternatively in the range of about 1000 to about 2000, alternatively about 2000 or higher, or any value, range, or sub-range therebetween. The flow through the incinerator 101 may be laminar or turbulent.

Figure 8A:
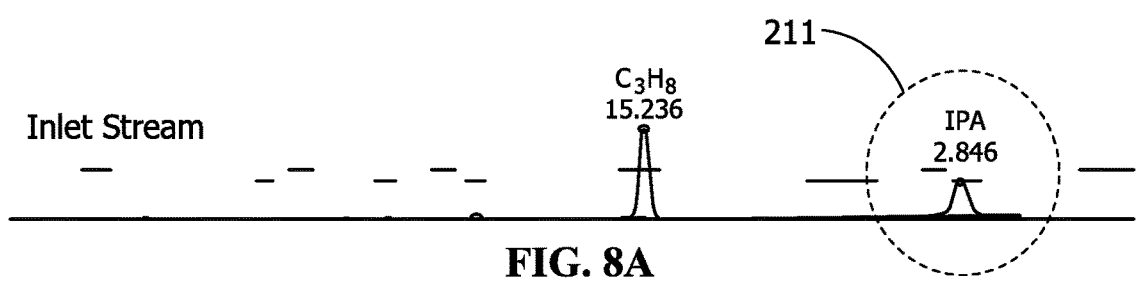
FIG. 8A is a graph of a gas chromatography scan of an inlet stream to an incinerator system, according to an embodiment of the present disclosure.
Figure 8B:
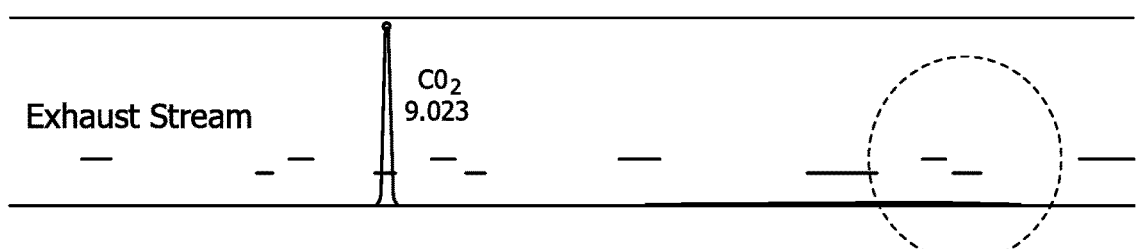
FIG. 8B is a graph of a gas chromatography scan of an exhaust stream from an incinerator system, according to an embodiment of the present disclosure.

Experimental testing was also completed using isopropyl alcohol (IPA) as a representative VOC and measuring the composition of the fuel-lean inlet stream 111 and the exhaust stream 105 by gas chromatography. The results are shown in FIG. 8A and FIG. 8B. FIG. 8A shows that the IPA peak 211 is detectable by gas chromatography in the fuel-lean inlet stream 111. FIG. 8B shows that no IPA peak appears at the same time location in the gas chromatograph for the exhaust stream 105. Similar testing completed with propyl acetate as the representative VOC and with toluene as the representative VOC also showed complete incineration of the representative VOCs.

Figure 9:
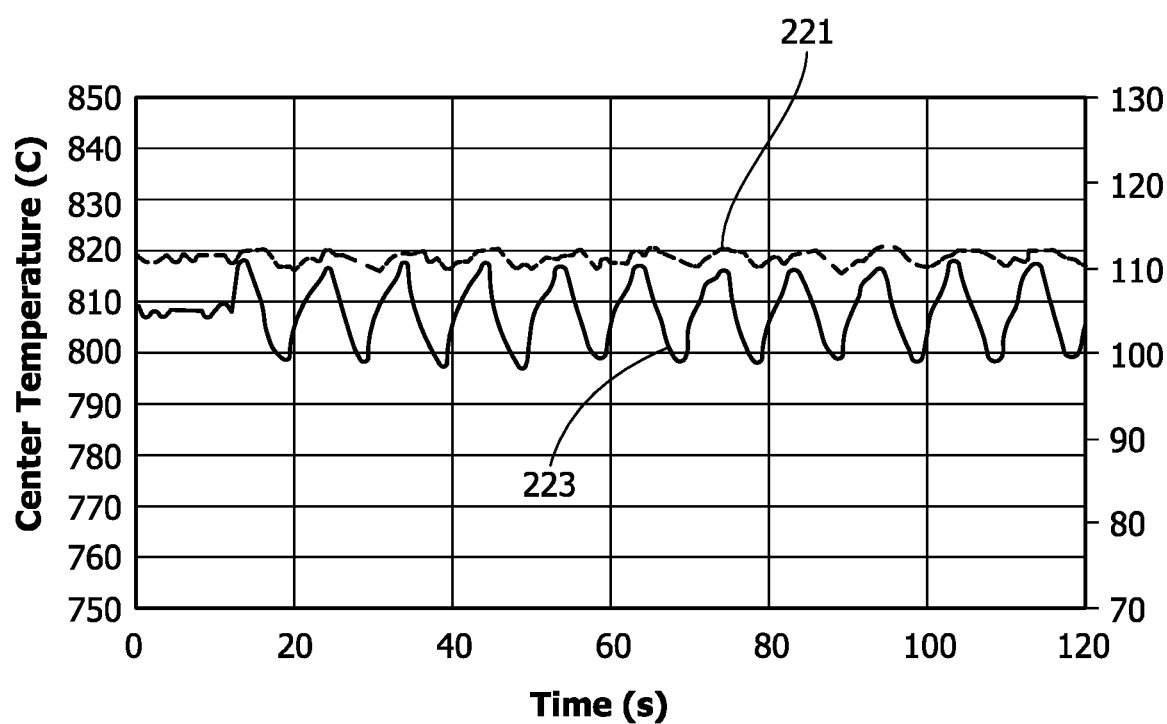
FIG. 9 is a graph showing the effect of fluctuating the inlet flow velocity on the temperature in the reaction zone of an incinerator system, according to an embodiment of the present disclosure.

Finally, an important feature of a VOC incinerator 101 is the ability to handle fluctuations in flow rate, as the emissions from a landfill or a natural gas condensate tank fluctuate over time. The velocity 221 of the fuel-lean inlet stream 111 through an incinerator 101 was fluctuated by 10% of the total velocity at a frequency of 0.1 Hz, and the combustion was sustained throughout the fluctuations. The measured corresponding temperature 223 of the reaction zone 103 along with the corresponding measured velocity 221 is shown in FIG. 9.

While the invention has been described with reference to one or more embodiments, it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

What is claimed is:

1. An incineration system comprising:
    an inlet channel supplying an inlet stream comprising a waste gas containing at least one volatile organic compound;
    a waste gas sensor measuring at least one property of the waste gas;
    an oxidizing gas supply controllably providing oxidizing gas to the inlet channel;
    an incinerator receiving the inlet stream from the inlet channel, the incinerator comprising:
    a spiral heat exchanger defining a substantially cylindrical reaction zone having a central axis and opposed first and second ends, an incoming path from the inlet channel at the first end to the reaction zone, and an outgoing path at the second end from the reaction zone to an exhaust channel, wherein the incoming path and the outgoing path extend in alternating concentric spirals about the reaction zone with the incoming path being countercurrent to the outgoing path;
    an ignitor initiating combustion of the inlet stream in the reaction zone of the incinerator; and a controller receiving data from the waste gas sensor and controlling flow of oxidizing gas from the oxidizing gas supply into the inlet channel;
    wherein the incoming path supplies the inlet stream to the reaction zone at a reaction zone inlet at the first end of the reaction zone and the outgoing path receives the exhaust stream from the reaction zone at a reaction zone outlet at the second end of the reaction zone opposite the first end such that the flow through the reaction zone is in the axial direction with respect to the spiral.

2. The incineration system of claim 1 further comprising a supplemental fuel supply controllably providing supplemental fuel to the inlet channel, wherein the controller controls flow of supplemental fuel from the supplemental fuel supply into the inlet channel.

3. The incineration system of claim 1, wherein the spiral heat exchanger comprises heat transfer enhancements configured to form Dean vortices or to generate turbulence capable of increasing heat transfer between the incoming path and the outgoing path.

4. The incineration system of claim 1, wherein the incoming path and the outgoing path each spirals at least 1080 degrees around the center.

5. The incineration system of claim 1, wherein the incinerator operates at an equivalence ratio less than 0.35.

6. The incineration system of claim 1, wherein combustion is sustained with the waste gas and the oxidizing gas but no supplemental fuel in the inlet stream.

7. The incineration system of claim 1, wherein the waste gas comprises methane and carbon dioxide released by a landfill.

8. The incineration system of claim 1, wherein the waste gas comprises volatile organic compounds released by a natural gas condensate tank.

9. The incineration system of claim 1, wherein the waste gas comprises volatile organic compounds released by a chemical plant.

10. The incineration system of claim 1, wherein the ignitor is selected from the group consisting of a glow plug, a spark plug, a resistance wire, or a pilot flame.

11. The incineration system of claim 1, wherein the incinerator further comprises a flow straightener in the reaction zone configured to reduce a radial component in the flow of the inlet stream through the reaction zone.

12. A combustion device comprising:
    a spiral heat exchanger defining a substantially cylindrical reaction zone having a central axis and opposed first and second ends, an incoming path at the first end and an outgoing path at the second end, wherein the incoming path and the outgoing path extending in alternating concentric spirals about the reaction zone with the incoming path being countercurrent to the outgoing path;
    an ignitor initiating combustion of an inlet stream in the reaction zone of the incinerator;
    wherein the incoming path supplies the inlet stream to the reaction zone at a reaction zone inlet at the first end of the reaction zone and the outgoing path receives an exhaust stream from the reaction zone at a reaction zone outlet at the second end of the reaction zone opposite the first end such that the flow through the reaction zone is in the axial direction with respect to the spiral.

13. The combustion device of claim 12 further comprising a flow straightener in the reaction zone configured to reduce a radial component in the flow of the inlet stream through the reaction zone.

14. The combustion device of claim 12, wherein the reaction zone is located at the center of the alternating concentric spirals.

15. An incineration process comprising:
    directing an inlet stream comprising a waste gas comprising at least one volatile organic compound into an incoming path of an incinerator comprising:
    a spiral heat exchanger defining a substantially cylindrical reaction zone having a central axis and opposed first and second ends, the incoming path at the first end and an outgoing path at the second end, wherein the incoming path and the outgoing path extending in alternating concentric spirals about the reaction zone with the incoming path being countercurrent to the outgoing path;
    heating the inlet stream along the incoming path while cooling an outlet stream in the outgoing path by heat exchange with the outlet stream; and
    incinerating the volatile organic compound of the inlet stream in the reaction zone to form the outlet stream;
    wherein the incoming path supplies the inlet stream to the reaction zone at a reaction zone inlet at the first end of the reaction zone and the outgoing path receives the exhaust stream from the reaction zone at a reaction zone outlet at the second end of the reaction zone opposite the first end such that the flow through the reaction zone is in the axial direction with respect to the spiral.

16. The incineration process of claim 15 further comprising mixing the waste gas with an oxidizing gas to form the inlet stream.

17. The incineration process of claim 15 further comprising mixing the waste gas with a supplemental fuel and an oxidizing gas to form the inlet stream.

18. The incineration process of claim 15 further comprising monitoring at least one property of the waste gas and adjusting an amount of at least one of a supplemental fuel and an oxidizing gas added to the waste gas to form the inlet stream.

* * * * *